United States Patent
Tu et al.

(10) Patent No.: US 10,075,711 B2
(45) Date of Patent: Sep. 11, 2018

(54) FLEXIBLE DATA ORGANIZATION FOR IMAGES

(71) Applicant: MICROSOFT TECHNOLOGY LICENSING, LLC, Redmond, WA (US)

(72) Inventors: Chengjie Tu, Sammamish, WA (US); Sridhar Srinivasan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/213,252

(22) Filed: Jul. 18, 2016

(65) Prior Publication Data

US 2017/0104992 A1    Apr. 13, 2017

Related U.S. Application Data

(60) Continuation of application No. 13/766,580, filed on Feb. 13, 2013, now Pat. No. 9,396,556, which is a (Continued)

(51) Int. Cl.
*H04N 19/00* (2014.01)
*H04N 19/107* (2014.01)
(Continued)

(52) U.S. Cl.
CPC ......... *H04N 19/107* (2014.11); *H04N 19/174* (2014.11); *H04N 19/186* (2014.11); *H04N 19/60* (2014.11); *H04N 19/66* (2014.11)

(58) Field of Classification Search
CPC ....................................................... H04N 19/00
(Continued)

(56) References Cited

U.S. PATENT DOCUMENTS

| 5,398,066 A | 3/1995 | Martinez-Uriegas et al. |
| 5,463,419 A | 10/1995 | Saito |

(Continued)

FOREIGN PATENT DOCUMENTS

WO    0002384 A2    1/2000

OTHER PUBLICATIONS

"Non-Final Office Action Issued in U.S. Appl. No. 11/444,685", dated Aug. 18, 2010, 12 Pages.

(Continued)

*Primary Examiner* — Andy Rao
(74) *Attorney, Agent, or Firm* — Shook, Hardy and Bacon, L.L.P.

(57) ABSTRACT

A system, a method and computer-readable media for encoding image data into a compressed bitstream. A mode selection component is configured to select a mode of operation for use in encoding image data. A spatial mode encoder is utilized when the mode selection component selects a spatial mode of operation. The spatial mode encoder is configured to encode the image data into packets by organizing the image data in accordance with a spatial partitioning. A frequency mode encoder is utilized when the mode selection component selects a frequency mode of operation. The frequency mode encoder is configured to encode the image data into packets by organizing the image data in accordance with a frequency ordering.

20 Claims, 10 Drawing Sheets

Related U.S. Application Data division of application No. 11/484,457, filed on Jul. 10, 2006, now Pat. No. 8,385,428, which is a continuation of application No. 11/444,685, filed on Jun. 1, 2006, now Pat. No. 7,949,054.

(51) Int. Cl.
*H04N 19/174* (2014.01)
*H04N 19/186* (2014.01)
*H04N 19/66* (2014.01)
*H04N 19/60* (2014.01)

(58) Field of Classification Search
USPC .......................................... 375/240.1–240.29
See application file for complete search history.

(56) References Cited

U.S. PATENT DOCUMENTS

| | | | |
|---|---|---|---|
| 6,144,763 A | 11/2000 | Ito | |
| 6,771,834 B1 | 8/2004 | Martins et al. | |
| 6,941,011 B2 | 9/2005 | Roylance et al. | |
| 6,958,772 B1 | 10/2005 | Sugimori | |
| 7,002,627 B1 | 2/2006 | Raffy et al. | |
| 7,079,690 B2 | 7/2006 | Boliek et al. | |
| 7,206,347 B2 | 4/2007 | Lim et al. | |
| 9,123,089 B2 | 9/2015 | Srinivasan et al. | |
| 2004/0234147 A1 | 11/2004 | Malvar | |
| 2004/0240746 A1 | 12/2004 | Aliaga et al. | |
| 2004/0252894 A1 | 12/2004 | Miyanohara | |
| 2005/0152605 A1 | 7/2005 | Hoogendijk | |
| 2006/0023954 A1 | 2/2006 | Ishizuka et al. | |
| 2006/0039463 A1 | 2/2006 | Kadono | |
| 2006/0176309 A1* | 8/2006 | Gadre | G06F 3/14 345/501 |
| 2008/0198935 A1* | 8/2008 | Srinivasan | H04N 21/6547 375/240.23 |

OTHER PUBLICATIONS

"Notice of Allowance Issued in U.S. Appl. No. 11/444,685", dated Mar. 8, 2011, 7 Pages.

"Non-Final Office Action Issued in U.S. Appl. No. 11/484,457", dated Sep. 14, 2011, 7 Pages.

"Notice of Allowance Issued in U.S. Appl. No. 11/484,457", dated Oct. 23, 2012, 7 Pages.

"Notice of Allowance Issued in U.S. Appl. No. 13/766,580", dated Mar. 17, 2016, 9 Pages.

Malvar, Henrique S., "Biorthogonal and Nonuniform Lapped Transforms for Transform Coding with Reduced Blocking and Ringing Artifacts", In IEEE Transactions on Signal Processing, vol. 46, Issue 4, Apr. 1998, pp. 1043-1053.

Subhasis, Saha, "Image Compression—from DCT to Wavelets: A Review", Retrieved From <<https://web.archive.org/web/20060613064127/http://acm.org/crossroads/xrds6-3/sahaimgcoding.html>>, Retrieved on: Mar. 24, 2006, 24 Pages.

Tanaka, et al., "The Orientation Adaptive Lapped Biorthogonal Transform for Efficient Image Coding", In IEEE Proceedings of International Conference on Image Processing, vol. 3, Oct. 7, 2001, pp. 214-217.

* cited by examiner

FLEXIBLE DATA ORGANIZATION FOR IMAGES

CROSS-REFERENCE TO RELATED APPLICATIONS

This application is a continuation of U.S. Ser. No. 13/766,580 (filed Feb. 13, 2013, and issuing as U.S. Pat. No. 9,396,556), which is a divisional application of U.S. Ser. No. 11/484,457 (filed Jul. 10, 2006, and issued as U.S. Pat. No. 8,385,428), which is a continuation of U.S. Ser. No. 11/444,685 (filed Jun. 1, 2006, and issued as U.S. Pat. No. 7,949,054). All of the aforementioned applications are incorporated by reference herein.

BACKGROUND

In recent years, computer users have become more and more reliant upon personal computers to store and present a wide range of digital media. For example, users often utilize their computers to store and interact with digital images. A digital image is a data entity composed of one or more two dimensional planes of data. An uncompressed or "source" image is generally stored or serialized in a raster scan order. To perform operations with respect to the uncompressed image, the pixels are scanned from left to right, top to bottom, and the color channels are generally interleaved. Uncompressed digital images, however, can consume considerable storage and transmission capacity.

To more efficiently store and transmit digital images, the image data may be compressed, and a variety of compression techniques exist in the art. In a compressed domain, data organization is determined, in part, by the compression algorithm. Image compression techniques generally remap the image into an alternate space by means of a data transform. For instance, data transforms such as discrete cosine transforms (DCT) and wavelets may be used to compress data. Compressed data may be organized in blocks having sequences of transform coefficients. The blocks may be scanned in order (e.g., left to right, top to bottom), with in-block data scanned using a "zig-zag scan pattern." In an alternative organization, the information related to the DC coefficients is serialized first, and the remaining coefficients follow.

Existing compression techniques may offer multiple degrees of freedom in organizing the transform data. For instance, data can be serialized by frequency band, by "precinct" (i.e., a spatial partitioning of data), by bitplane and/or by color channel. While this organization provides freedom to a user, it may be difficult to implement. For example, decoders attempting to recreate images may require additional capabilities to handle the various combinations of data. Further, decoders may require more memory and more computational power to handle arbitrarily organized data. In short, while existing compression techniques may provide flexibility in the organization of compressed domain data, an unacceptably high level of complexity often accompanies such flexibility. Indeed, existing compression techniques do not offer a flexible, yet tractable, organization of compressed domain data.

SUMMARY

The present invention meets the above needs and overcomes one or more deficiencies in the prior art by providing systems and methods for organizing a bitstream of compressed data. A mode selection component is configured to select a mode of operation for use in encoding image data. A spatial mode encoder is utilized when the mode selection component selects a spatial mode of operation. The spatial mode encoder is configured to encode the image data into packets by organizing the image data in accordance with a spatial partitioning. A frequency mode encoder is utilized when the mode selection component selects a frequency mode of operation. The frequency mode encoder is configured to encode the image data into packets by organizing the image data in accordance with a frequency ordering.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Figure 1:
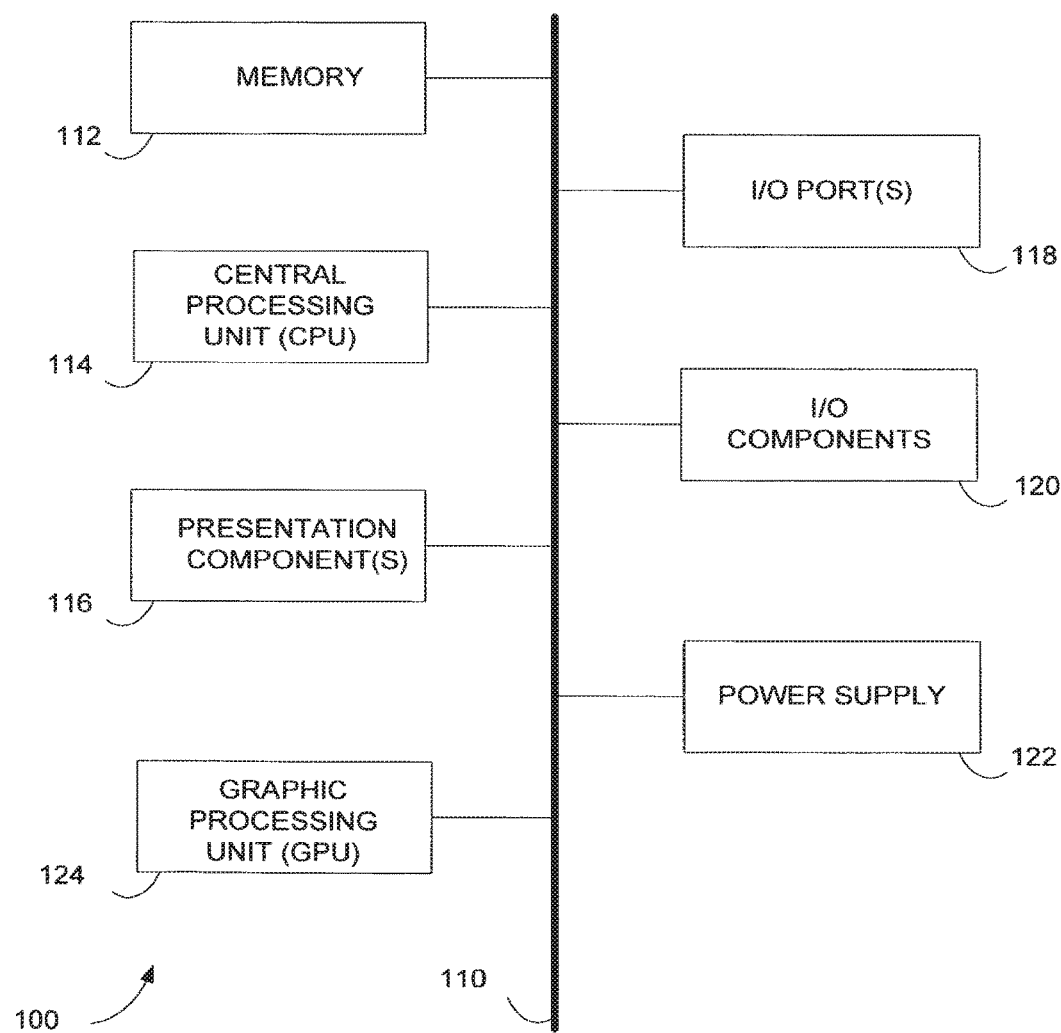
FIG. 1 is a block diagram of a network environment suitable for use in implementing the present invention.

Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, specialty computing devices (e.g., cameras and printers), etc. The invention may also be practiced in distributed computing environments where tasks are performed by remote-processing devices that are linked through a communications network.

With reference to FIG. 1, computing device 100 includes a bus 110 that directly or indirectly couples the following elements: memory 112, a central processing unit (CPU) 114, one or more presentation components 116, input/output ports 118, input/output components 120, an illustrative power supply 122 and a graphics processing unit (GPU) 124. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, CPUs and GPUs have memory. The diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As previously mentioned, the present invention provides an improved system and method for representing digital images. An image, as the term is used herein, is composed of multiple color planes (or a single plane). The first color plane is referred to as luminance and roughly corresponds to a monochrome representation of the image. The remaining color planes are referred to as chrominance planes. Generally, luminance and chrominance planes are of the same size. However, in certain instances, the chrominance planes may be half the width and/or height of the luminance planes. In addition to the luminance and chrominance planes, an image may carry an alpha plane that carries transparency information.

Figure 2:
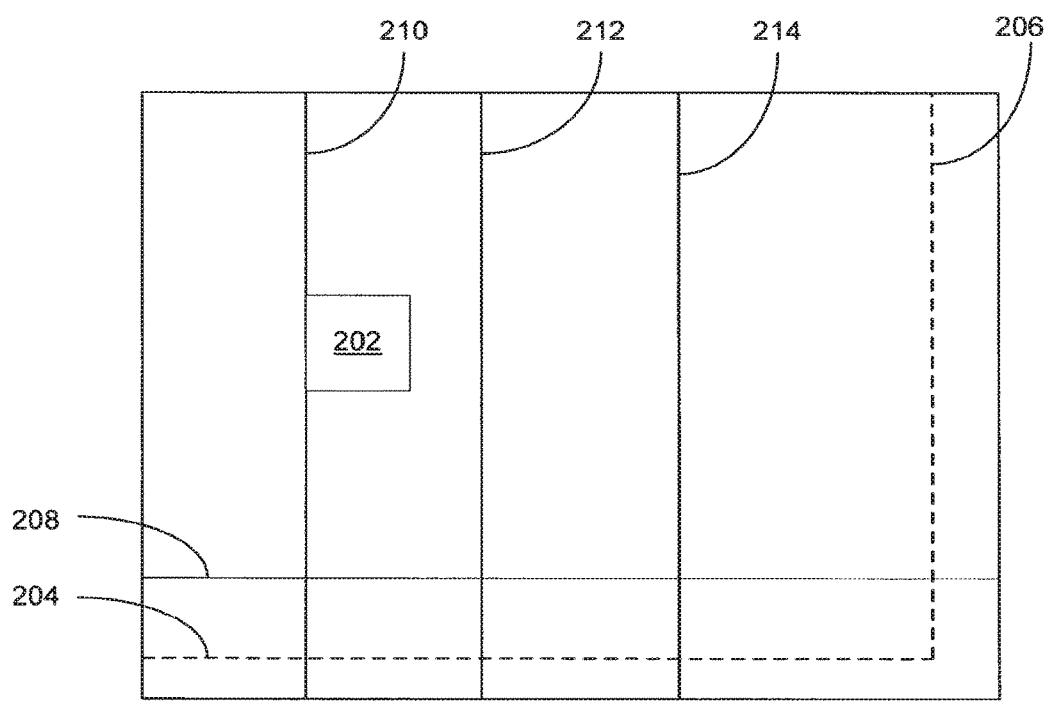
FIG. 2 is a block diagram illustrating an image that is partitioned in accordance with one embodiment of the present invention.

FIG. 2 illustrates an image 200 that is partitioned in accordance with an image structure hierarchy. The image 200 is composed of non-overlapping four pixel by four pixel blocks. Though these blocks are not presented on the FIG. 2, the entire area of the image 200 may be divided into such blocks. The blocks cover the entire image and may spill over the image boundaries. In this case, pixel values within a block but outside of the image are arbitrarily defined by extension or extrapolation. In one embodiment, the blocks are equally applicable to luminance, chrominance and alpha planes regardless of color format. In this embodiment, blocks of all colorplanes are collocated for color formats other than grayscale, YUV 4:2:0 and YUV 4:2:2. For blocks of YUV 4:2:0 and YUV 4:2:2, only the chrominance planes are collocated.

The blocks may be grouped into non-overlapping four block by four block clusters, known as macroblocks. For example, a macroblock 202 resides within the image 200. Though only one macroblock is presented on the FIG. 2, the entire area of the image 200 may be divided into these macroblocks. Each macroblock contains blocks of all colorplanes, and the macroblocks form a regular pattern on the image 200. For example, macroblocks of grayscale images are composed of sixteen blocks, while macroblocks of YUV 4:2:0 images are composed of sixteen luminance blocks, and four each of U and V plane blocks in a two-by-two pattern collocated with the sixteen luminance blocks. Macroblocks of YUV 4:2:2 images are composed of sixteen luminance blocks, and eight each of U and V plane blocks in a four-by-two pattern collocated with the sixteen luminance blocks. Macroblocks of YUV 4:4:4 images are composed of forty-eight blocks, sixteen for each plane in collocated four-by-four patterns. Like blocks, the macroblocks may spill over image boundaries. In this case, pixel values outside of the image and within a macroblock are arbitrarily defined such as by extension or extrapolation. For example, the dashed-lines 204 and 206 represent the original right and bottom edges of the image 200. To align the edges of the image 200 with the edges of the various macroblocks, the image 200 includes extrapolated values for pixels residing beyond the dashed-lines 204 and 206.

The macroblocks may be grouped into regular structures called tiles. For example, tile boundaries 208, 210, 212 and 214 divide the image 200 into eight tiles. The tiles extend to the edges of the image 200 and form a regular pattern on the image 200. Stated another way, the tiles in a horizontal row are of the same height and are aligned, while the tiles in a vertical column are of the same width and are aligned. Subject to such a regular pattern, the tiles may be of arbitrary size, but they must be macroblock aligned. So the tiles extend beyond the dashed-lines 204 and 206 to ensure macroblock alignment. In one embodiment, the image 200 contains between one and 256 columns of tiles in the horizontal direction and between one and 256 rows of tiles in the vertical direction. In this embodiment, the image 200 may contain between one and 65536 tiles. When an image contains one tile, it is said to be "untiled." If the number of tiles is greater than one, the image is said to be "tiled."

As will be appreciated by those skilled in the art, spatial partitioning of an image may be desirable for several reasons. For one, spatial partitioning divides the image into independently decodable regions, and these regions can be sent in the bitstream in an arbitrary order, or not at all. This allows for the efficient extraction of regions and for the ability to encode and decode large images with the traditional size bounds.

Figure 3:
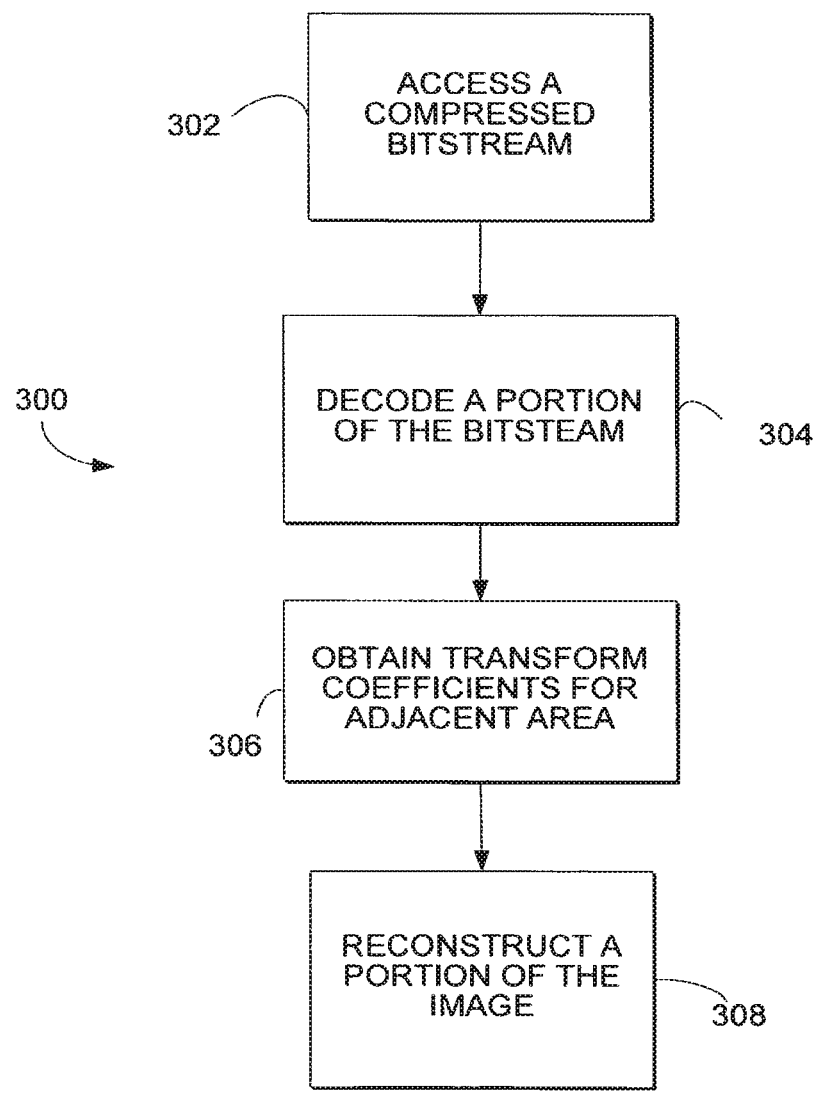
FIG. 3 illustrates a method in accordance with one embodiment of the present invention for reconstructing an image from a compressed bitstream.

FIG. 3 illustrates a method 300 for reconstructing an image from a compressed bitstream. The method 300, at 302, accesses the compressed bitstream. The compressed bitstream may define a spatial partitioning for the image. For example, the image may be partitioned in accordance with the image structure hierarchy illustrated by FIG. 2. The method 300 may use a partition rule in the signaling of the partition information. This partition rule may be defined in the bitstream subject to format specifications.

In one embodiment, the method 300 employs a simple partitioning rule—the image is divided into non-overlapping rectangular regions (known as tiles) such that all partitions along a row of pixels have the same height and all partitions along a column of pixels have the same width. Further, all partitions are aligned with macroblocks, meaning that the grid is aligned to multiples of 16 pixels in both vertical and horizontal directions. Such a partitioning yields the previously discussed tiles of FIG. 2, and this partition rule may be communicated in the bitstream in a very concise manner. First, the size of the image is sent in the bitstream. From this, the width and height in macroblock units can be derived as (x+15)/16, where x is the image size (width or height) and integer division is used. Second, the number of horizontal and vertical tiles is sent in the bitstream. Next, the width (in macroblock units) of each of the horizontal and vertical partitioning (except the last one) is sent. This information may be sent with a fixed or variable length code.

At 304, the method 300 decodes a portion of the bitstream that is associated with a tile. For example, the information in the bitstream related to a tile may be decoded to yield a sequence of transform coefficients and/or other meaningful symbols. As previously mentioned, tiling is a spatial partitioning of the image into "independently decodable regions." In the bitstream, all the compressed data related to a spatial tile is located in an addressable and contiguous area or areas (often referred to as packets) in a file. Therefore, by decoding these packets the tile may be reconstructed, subject to compression loss.

To minimize or eliminate such compression loss, the method 300, at 306, obtains additional transform coefficients by decoding data associated with areas of the image that are adjacent to the tile of interest. As known to those in the art, strict data partitioning with independently decodable tiles may give rise to sharp edge artifacts between tiles. An alternate goal of tiling, however, is for a tile to be independently decodable in an entropy coding sense but not in a signal processing sense. Entropy coding, in general, is known in the art. Using entropy coding, reconstructed data within a tile depends on the transform coefficients of neighboring blocks and macroblocks adjacent to boundaries of the tile of interest. Therefore, the method 300 obtains such additional transform coefficients at 306.

At 308, the method 300 reconstructs the portion of the image associated with the tile of interest. The reconstructed data depends on transform coefficients and other information not only from the tile of interest, but the data also depends on transform coefficients from the other, adjacent tiles. As will be appreciated by those skilled in the art, images reconstructed in this manner will not visibly indicate evidence of tiling, assuming that a suitable decorrelating transform is applied across block boundaries and reasonable encoder parameters are used.

Figure 4:
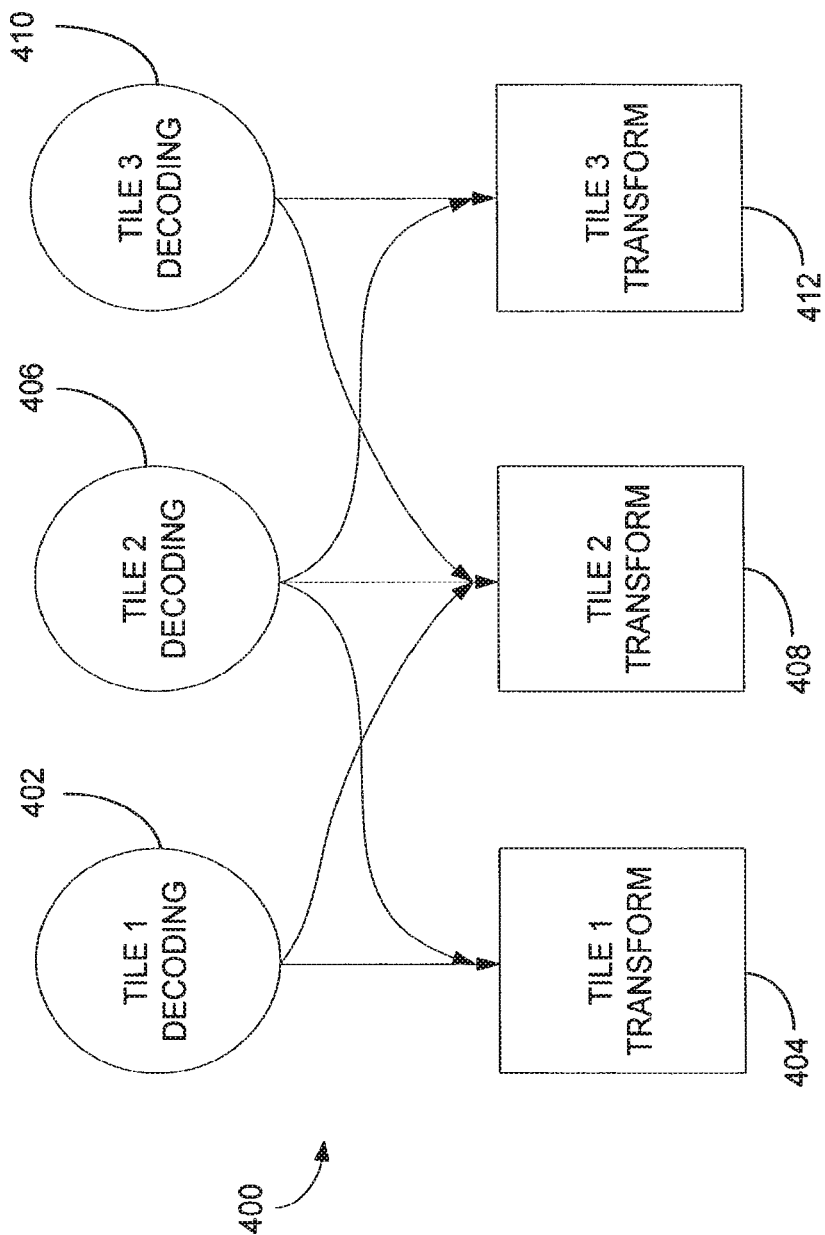
FIG. 4 is a block diagram illustrating the decoding of tiles in accordance with one embodiment of the present invention.

FIG. 4 provides a schematic diagram of a system 400 for independently decoding tiles in an entropy sense (i.e., by the sharing of entropy decoded information across tiles). Data associated with a first tile is decoded into transform coefficients at a block 402. These transform coefficients are used by a transform block 404 to reconstruct the portion of an image associated with the first tile.

To reconstruct the first tile, the transform block 404 also utilizes transform coefficients associated with a second tile. The second tile is adjacent to the first tile. Data associated with the second tile is decoded into transform coefficients by a block 406. Transform coefficients from the block 406 are shared with the transform block 404 to aid in reconstructing the first tile. Likewise, a transform block 408 reconstructs the second tile with transform coefficients from both the block 402 and the block 406 (i.e., coefficients from both the first and the second tiles).

To reconstruct the second tile, the transform block 408 also utilizes transform coefficients associated with a third tile. The third tile is adjacent to the second tile. Data associated with the third tile is decoded into transform coefficients by a block 410. These transform coefficients from the block 410 are then shared with the transform block 408 to aid in reconstructing the second tile. Similarly, a transform block 412 reconstructs the third tile with transform coefficients from both the block 406 and the block 410. FIG. 4 depicts a 1D embedding of tiles. In two dimensions, a tile may need to access data in up to 8 other tiles adjacent to it in order to reconstruct the tile.

It should be noted that the system 400 represents a decoder. As will be appreciated by those skilled in the art, encoder side tiling is a mirror image of decoder side tiling. Those skilled in the art will further appreciate that tiles may be entropy decoded in arbitrary order, and, subsequent to gathering all the relevant data, transforms can be applied in any order as well. In one embodiment, the shared data illustrated by FIG. 4 is only one macroblock wide. Since the shared information is relatively small, tiles may be treated as strict tiles on the decode side at a small cost of decreased visual quality. This may be necessary when sharing of data is not feasible.

Figure 5:
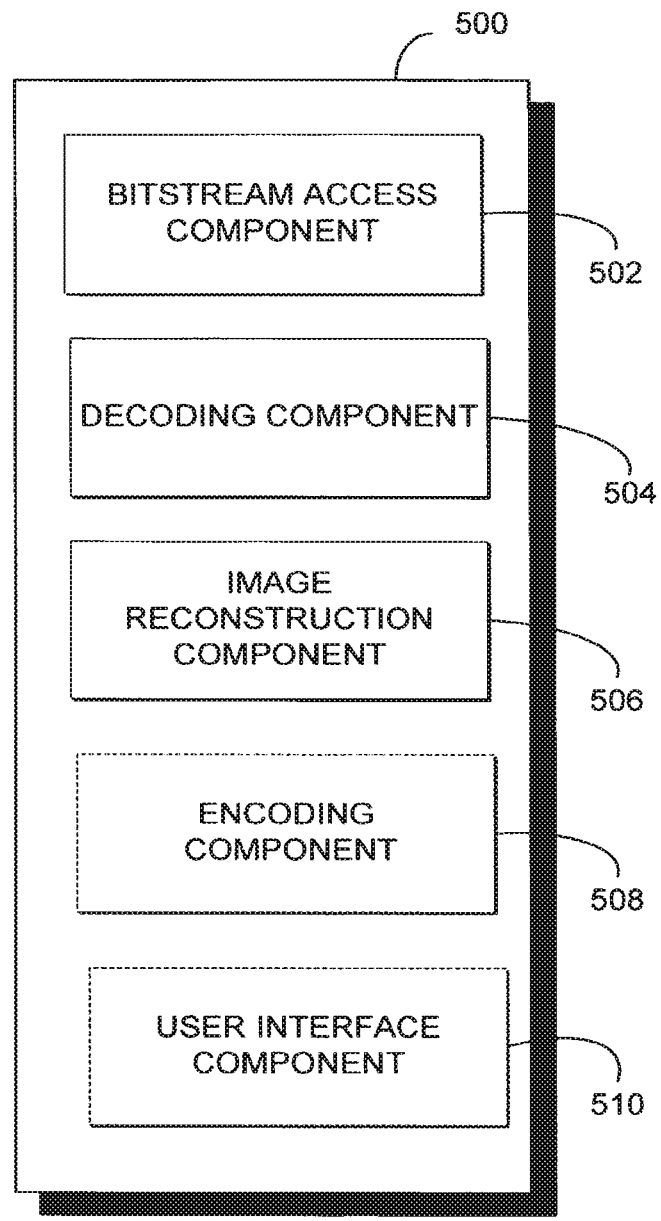
FIG. 5 is a schematic diagram illustrating a system for reconstructing an image from a compressed bitstream in accordance with one embodiment of the present invention.

FIG. 5 illustrates a system 500 for reconstructing an image from a compressed bitstream. The system 500 includes a bitstream access component 502. The bitstream access component 502 is configured to access a compressed bitstream that includes encoded image data. In one embodiment, the compressed bitstream defines a spatial partitioning for an image that divides the image into one or more tiles, i.e., one or more independently decodable regions.

The system 500 further includes a decoding component 504, which is configured to generate a series of transform coefficients by decoding the encoded image data from the compressed bitstream. For example, the decoding component 504 may decode the image data associated with a selected tile. Further, the decoding component 504 may decode image data associated with tiles adjacent to the selected tile.

An image reconstruction component 506 is also included in the system 500. The image reconstruction component 506 may be configured to reconstruct the image from the transform coefficients. To reconstruct a tile, the image reconstruction component 506 may utilize both transform coefficients associated with the selected region and transform coefficients associated with one or more areas adjacent to the selected region. For example, the image reconstruction component 506 may utilize the system 400 of FIG. 4 for independently decoding tiles in an entropy sense The system 500 may optionally include an encoding component 508 and/or a user interface component 510. The encoding component 508 may be configured to utilize entropy encoding to encode image data. Such encoding is the mirror image of the decoding performed by the decoding component 504. This encoding utilizes image data associated with areas adjacent to a selected region in the encoding of that region. Finally, the user interface component 510 may be configured to enable the image to be presented to a user after the image has been reconstructed.

Figure 6:
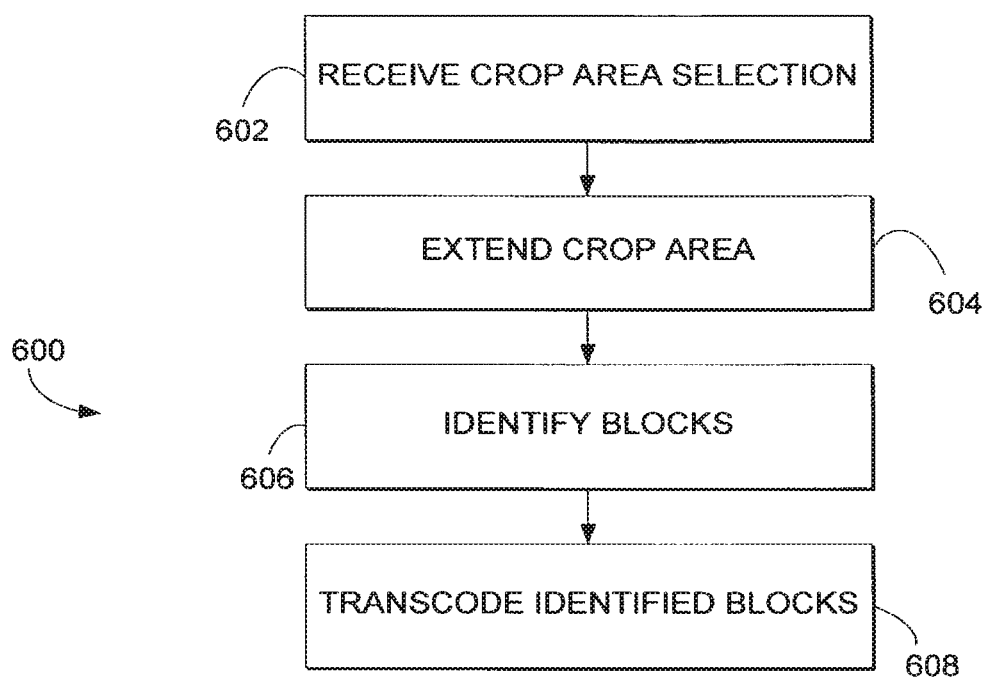
FIG. 6 illustrates a method in accordance with one embodiment of the present invention for transcoding a cropped version of a digital image.

As will be appreciated by those skilled in the art, one desirable feature of a good compressed image format is the ability to losslessly transcode a cropped version of the image within the same format. Lossless in this case means there is no additional loss introduced in the process of cropping. The format described herein may supports this feature, and FIG. 6 illustrates a method 600 for transcoding a cropped version of a digital image.

The method 600, at 602, receives a selection of a crop area within a digital image. The crop area may be selected by a variety of inputs or signals. While the original digital image may be partitioned into macroblocks, the crop area may not align with the macroblock grid. In this instance, macroblocks in the original image will not directly correspond to macroblocks in the cropped image. Even if the crop area is fully macroblock aligned, the cropped area will depend on macroblock data outside of the cropped area due to overlap. This means that the neighboring macroblock data must be retained along with the cropped image.

At 604, the method 600 extends the crop area by a predetermined amount in at least one direction. The new area may be referred to as an extended crop area. In one embodiment, the extended crop area is obtained by stretching the crop area by a predetermined number of pixels in each direction, except where the side runs into the boundary of the image.

The method 600, at 606, identifies each macroblock that overlaps at least a portion of the extended crop area. The macroblocks are obtained by macroblock aligning the extended crop area in all directions so as to include all macroblocks overlapping the extended crop area. These identified macroblocks may be referred to as the extended crop image. At 608, the method 600 transcodes the identified blocks to generate a cropped version of the digital image. In one embodiment, this area is transcoded by entropy decoding the relevant tiles and entropy encoding the relevant macroblocks alone. Indeed, the tiling structure of the extended cropped image is derived from the tiling structure of the original image by default. Since bitstream parameters can change at the tile level, the tiles cannot be coalesced in general.

Figure 7:
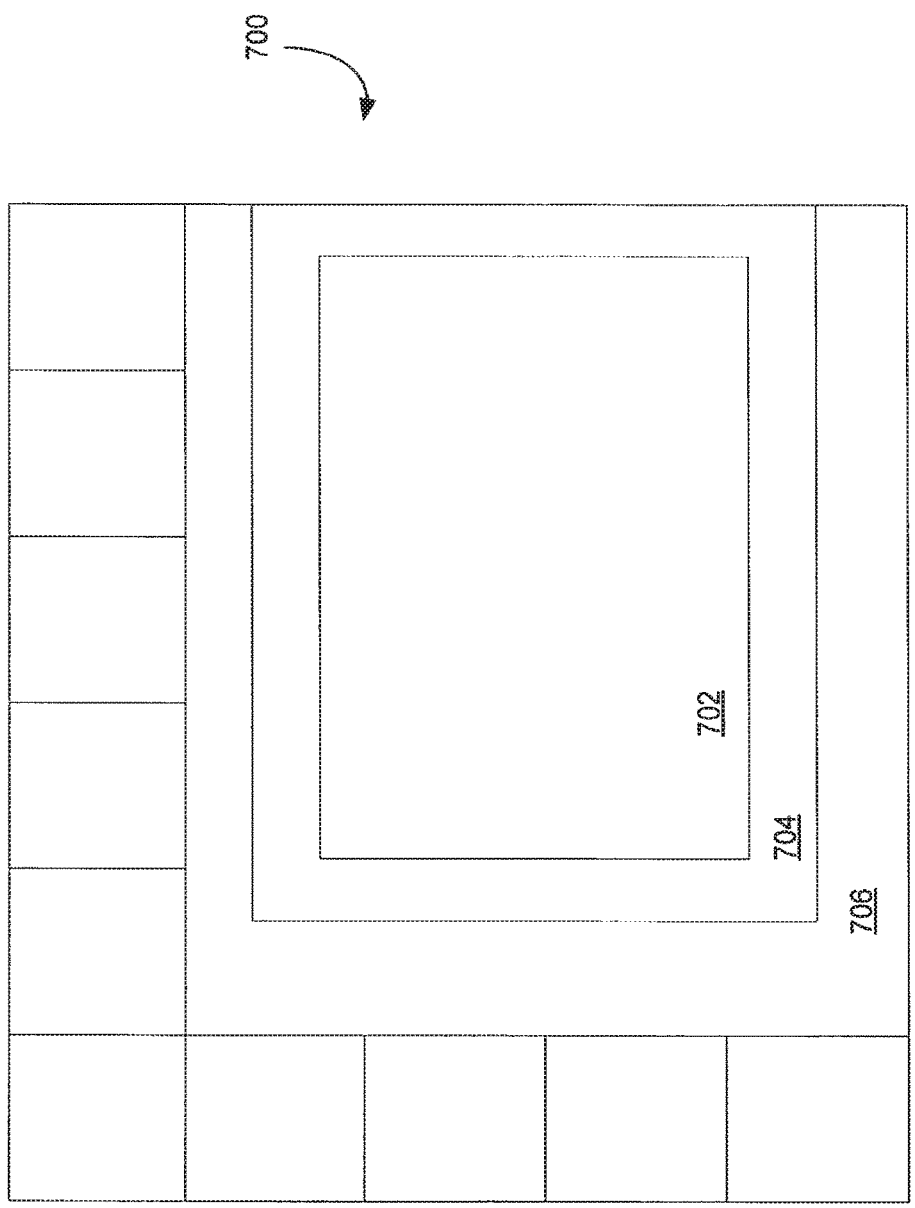
FIG. 7 is a block diagram illustrating an image undergoing cropping operations in accordance with one embodiment of the present invention.

FIG. 7 illustrates an image 700 undergoing cropping operations. A crop rectangle 702 is identified within the image 700. In one embodiment, the crop rectangle 702 is permitted to be non-macroblock aligned in all directions. The crop rectangle 702, for example, may be inscribed by three pixels on the top, left, right and bottom of the macroblock grid. This allows the crop rectangle 702 to be arbitrarily aligned. To facilitate this arbitrary alignment, an extended signaling mechanism may be used in the image header of the new "cropped" image defined by the crop rectangle. For example, a flag may indicate whether the cropped image is inscribed. If the crop rectangle 702 is inscribed, symbols may be sent to indicate the inscribed offsets in the top, left, bottom and right directions.

The image 700 further includes an extended crop rectangle 704. The extended crop rectangle 704 may be obtained by stretching the crop rectangle 702 by D pixels in each direction, except where a side runs into a boundary of the image 700. In one embodiment, D is set to 0, 2 or 10 pixels for three permissible overlap modes that correspond to no overlap, overlap of high frequency alone and overlap of both low and high frequencies.

An extended cropped image 706 is also included in the image 700. The extended cropped image 706 is obtained by macroblock aligning the extended crop rectangle 704 in all directions. Such macroblock aligning allows selection of all macroblocks overlapping the extended crop rectangle 704. The extended cropped image 706 may be transcoded by entropy encoding the relevant macroblocks alone. Inscribed offsets may also correspond to the extended cropped image 706.

Figure 8A:
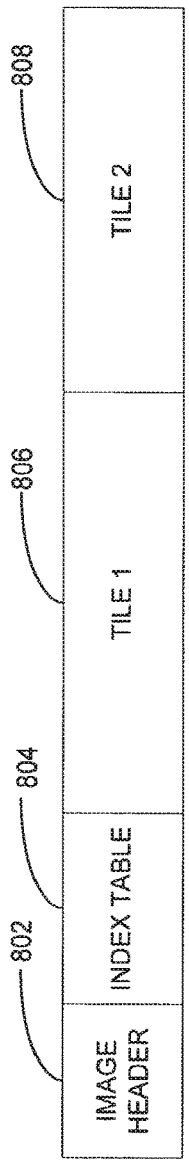
FIGS. 8A, 8B and 8C are block diagrams of a bitstream in accordance with one embodiment of the present invention.
Figure 8B:
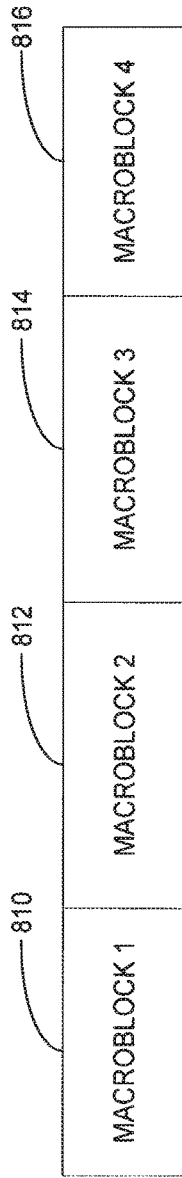
Figure 8C:
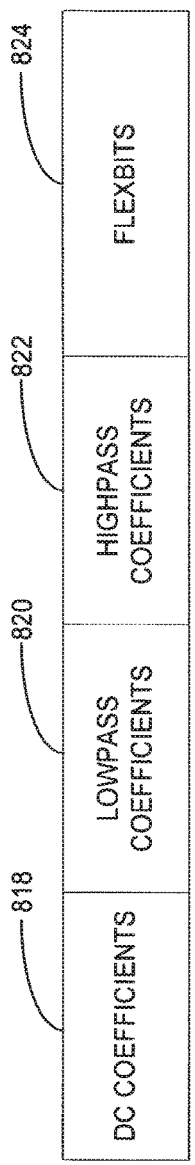

FIGS. 8A, 8B and 8C illustrate a bitstream 800 that contains information representing a digital image. Turning initially to FIG. 8A, the bitstream 800 includes an image header 802 and an index table 804. These elements may contain a variety of information enabling the decoding of the bitstream 800. Following the index table 804, the bitstream 800 includes a packet 806 and a packet 808. In one embodiment, each tile of an image is placed in a separate data segment called a packet, and the bitstream 800 is organized in accordance with such packets. Accordingly, the packets 806 and 808 each correspond to an image tile.

In one embodiment, there are two fundamental modes of operation affecting the structure of the bitstream—a spatial mode and a frequency mode. A one-bit signal in the image header 802 specifies which of the modes is used. In both the modes, the bitstream is laid out as a header, followed by a sequence of tiles as shown in FIG. 8A.

FIG. 8B illustrates the structure of the packet 808 when the spatial mode is in operation. In the spatial mode, the bitstream of each tile is laid out in macroblock order, and the compressed bits pertinent to each macroblock are located together. Accordingly, the packet 808 includes segments 810, 812, 814 and 816. Each of these segments is associated with one macroblock. In one embodiment, the macroblock data is laid out in raster scan order, i.e. scanning left to right, top to bottom.

FIG. 8C illustrates the structure of the packet 808 when the frequency mode is in operation. In the frequency mode, the bitstream of each tile is laid out as a hierarchy of bands. The first band 818 carries the DC value of each macroblock in raster scan order. The second band 820 carries the lowpass coefficients. For example, there may be fifteen lowpass coefficients in each macroblock for each color plane, with some possible exceptions. The third band 822 carries the remaining high pass coefficients of each macroblock color-plane (with some possible exceptions). Finally, the fourth band 824 is called Flexbits and is an optional layer that carries information regarding the low order bits of the highpass coefficients particularly for lossless and low loss cases.

In one embodiment, the entire or several lower bits of the Flexbits bands may be skipped in the bitstream. If the entire Flexbits bands are skipped, the highpass subbands may also be skipped. Furthermore, if the highpass subbands are skipped, the lowpass subbands may be skipped. This applies to both bitstream modes. (Note that in the spatial mode, each macroblock consists of a DC part, a lowpass part, a highpass part and a Flexbits part). In this embodiment, the decoder may have the flexibility to fill the skipped data, and the skipped segments may be signaled in the image header with a code. This embodiment may be useful for applications such as image downsampling and low bitrate coding.

As will be appreciated by those skilled in the art, each mode of operation may have its own advantages. The spatial mode, for example, may be easier to implement and less complex, while having a smaller memory footprint on the encoder/decoder. The frequency mode may offer benefits of a hierarchical representation of the image, which allows for thumbnails, progressive display, fast zooming, and error protection.

Figure 9:
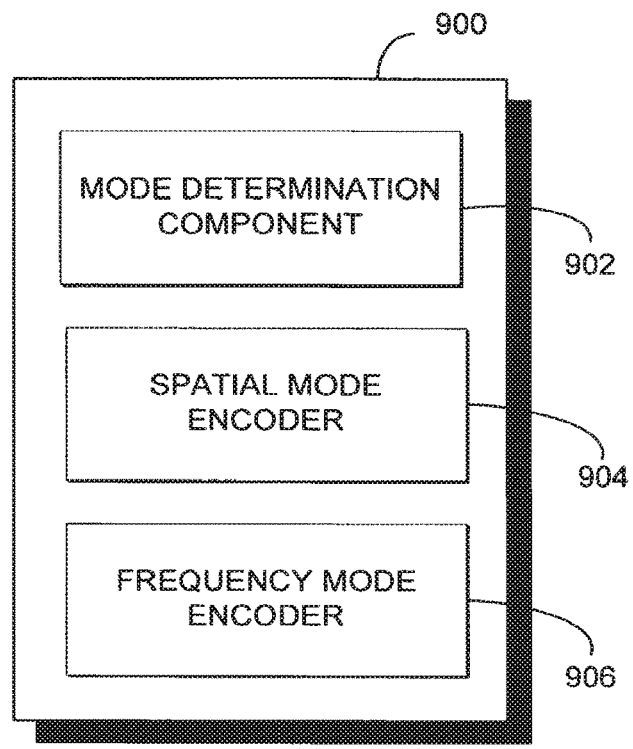
FIG. 9 is a schematic diagram illustrating a system for encoding a bitstream in accordance with one embodiment of the present invention.

FIG. 9 illustrates a system 900 for encoding a bitstream such as the bitstream 800. The system 900 includes a mode determination component 902. The mode determination component 902 permits selection of either the spatial mode or the frequency mode. As previously mentioned, these modes each have their own advantages. Once a mode is determined, an image may be reduced to a bitstream in accordance with the selected mode. Accordingly, the system 900 includes a spatial mode encoder 904 for use in structuring packet data in accordance with the spatial mode. When the frequency mode is selected, a frequency mode encoder 906 may be used to structure packet data in accordance with the frequency mode.

Figure 10:
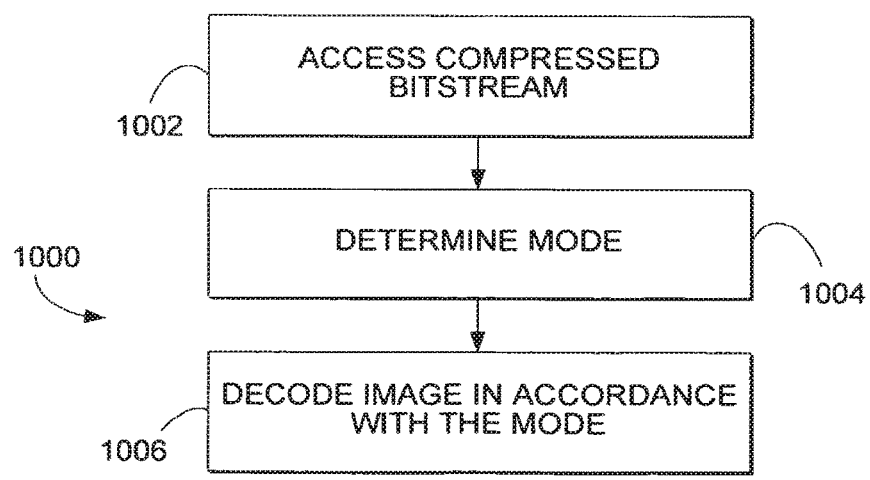
FIG. 10 illustrates a method in accordance with one embodiment of the present invention for decoding image data from a bitstream.

FIG. 10 illustrates a method 1000 for decoding image data from a bitstream. At 1002, the method 1000 accesses a compressed bitstream. For example, the compressed bitstream may be the bitstream 800 of FIG. 8. The method 1000, at 1004, determines whether the packets in the bitstream are encoded in accordance with either the spatial mode or the frequency mode. A variety of techniques may be utilized in this determination. In one embodiment, a signal in an image header specifies which mode is present. At 1006, the method 1000 decodes the compressed bitstream in accordance with the mode that was determined at 1004.

Figure 11:
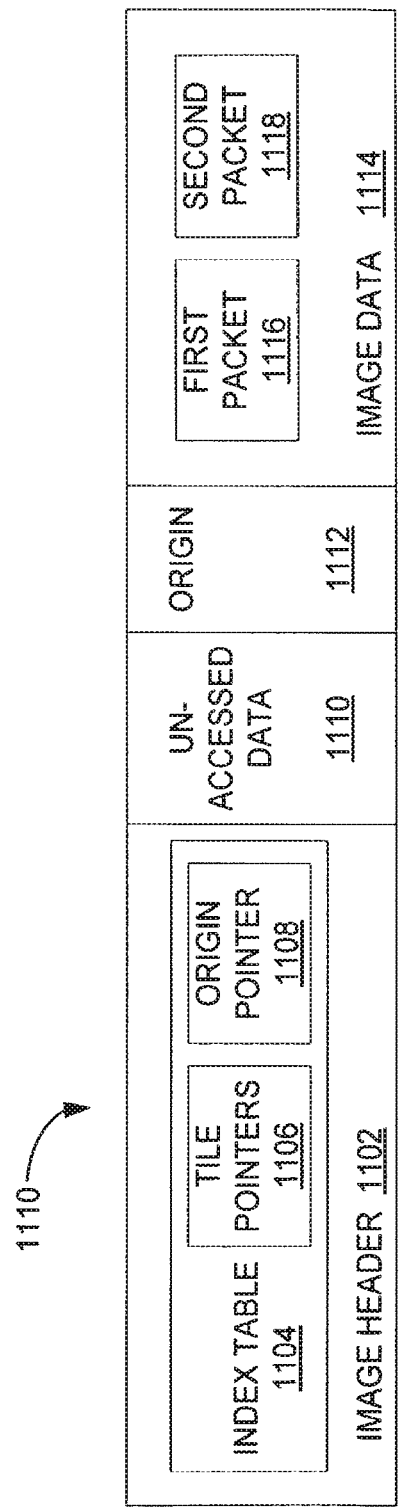
FIG. 11 is a block diagram illustrating the packetization and indexing of a bitstream in accordance with one embodiment of the present invention.

FIG. 11 illustrates the packetization and indexing of a bitstream 1100. The bitstream 1100 includes an image header 1102, which contains a variety of information needed to decode the bitstream 1100. For example, the image header 1102 contains a table of pointers referred to as an index table 1104.

The index table 1104 is optional if the number of tiles is one and the spatial mode is used. Otherwise, the index table 1104 is mandatory. In one embodiment, the index table 1104 is byte aligned, and the pattern of first two bytes is hexadecimal 0x0001. Following these bytes resides a sequence of pointers known as tile pointers 1106. The number of the tile pointers 1106 is equal to the number of tiles if the spatial mode is used and is equal to the number of tiles times (four minus the number of bands skipped) if the frequency mode is used. Each pointer may be a variable length symbol, and all pointers are non-negative. The index table 1104 further includes another pointer called the origin pointer 1108. The origin pointer 1108 defines an un-accessed segment of data 1110 and defines an origin 1112. The pointers in the tile pointers 1106 index from the origin 1112 and provide offsets from the origin 1112 to respective tiles. The un-accessed segment of data 1110 is a data segment not currently handled but which may be used in bitstream extensions.

The bitstream 1100 further includes image data 1114, which is organized in accordance with the previously discussed tiling. Each tile in an image is placed in a separate data segment called packet. For example, the image data 1114 includes a first packet 1116, which contains data for a first tile. Also, the image data 1114 includes a second packet 1118, which contains data for a second tile. In one embodiment, the packets 1116 and 1118 each include a packet header followed by packet data. The packet header carries information required to decode the packet data such as quantization modes and parameters. The packet header may include information related to the tile location and the tile type. For example, the packet header may indicate the tile includes the DC band, the lowpass band, the highpass band or the Flexbits component.

In one embodiment, there may be un-accessed data between the packets 1116 and 1118 in the image data 1114. The un-accessed segment of data 1110 also represents unused data. These two "gaps" in the bitstream format may be intentional. These gaps allow for additional data to be inserted, while maintaining compatibility of the bitstream with a current format. As will be appreciated by those skilled in the art, these gaps support backward compatibility by enabling a future, presumably higher quality bitstream to be decoded (to some degree of fidelity or viewability) by existing decoders.

Further, the image header 1102 may contain version information for the bitstream 1100. Future bitstreams that are backward compatible with the current format may use a higher version number than the bitstream 1100. As will be appreciated by those skilled in the art, this signaling design enables backward compatibility and may allow future decoders to exercise future bitstream changes.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A method for reconstructing an image from a compressed bitstream, the method comprising:
    accessing a compressed bitstream that includes encoded image data,
    wherein the compressed bitstream defines a spatial partitioning for the image that divides the image into a tile, which includes a plurality of macroblocks;
    wherein the tile is encoded and represented in a packet; and
    wherein the packet is organized into a hierarchy of bands, such that a band of the hierarchy includes a specified frequency coefficient of the plurality of macroblocks;
    decoding at least a portion of the encoded image data to generate a plurality of transform coefficients; and
    reconstructing the tile based on the generated plurality of transform coefficients including transform coefficients associated with the tile and transform coefficients associated with one or more adjacent tiles.

2. The method of claim 1, wherein the hierarchy of bands includes:
a first band carrying a DC value of all macroblocks of the plurality,
a second band carrying lowpass coefficients of all macroblocks,
a third band carrying highpass coefficients of all macroblocks, and
a fourth band carrying instructions related to low-order bits of the highpass coefficients.

3. The method of claim 1, wherein boundaries of the tile are aligned with boundaries of the plurality of macroblocks.

4. The method of claim 3, wherein each macroblock of the plurality of macroblocks includes a 4×4 grid of 16 blocks, and wherein each block of the 16 blocks includes a 4×4 array of 16 pixels.

5. The method of claim 1, wherein the tile abuts the one or more adjacent tiles and does not overlap the one or more adjacent tiles.

6. The method of claim 1, wherein reconstructing the tile includes utilizing transform coefficients associated with two or more adjacent tiles.

7. A method for reconstructing an image from a compressed bitstream, the method comprising:
accessing a compressed bitstream including encoded image data, wherein the compressed bitstream includes a first packet comprising a first portion of the encoded image data associated with a first tile of the image and a second packet comprising a second portion of the encoded image data associated with a second tile of the image;
decoding the first portion of the encoded image data organized in the first packet to generate a first series of transform coefficients associated with the first tile;
decoding the second portion of the encoded image data organized in the second packet to generate a second series of transform coefficients associated with the second tile;
reconstructing the first tile based on the first series of transform coefficients and at least a portion of the second series of transform coefficients; and
reconstructing the second tile based on the second series of transform coefficients and at least a portion of the first series of transform coefficients.

8. The method of claim 7, wherein the first tile is partitioned into a plurality of macroblocks.

9. The method of claim 8, wherein the first packet is organized into a hierarchy of bands, such that a band of the hierarchy includes a specified frequency coefficient of the plurality of macroblocks.

10. The method of claim 9, wherein the hierarchy of bands includes:
a first band carrying a DC value of all macroblocks of the plurality,
a second band carrying lowpass coefficients of all macroblocks,
a third band carrying highpass coefficients of all macroblocks, and
a fourth band carrying instructions related to low-order bits of the highpass coefficients.

11. The method of claim 8, wherein the first packet is organized into a plurality of segments, and wherein each segment is associated with a single respective macroblock included among the plurality of macroblocks.

12. The method of claim 7,
wherein the compressed bitstream comprises a header having a signal indicating whether the compressed bitstream is organized according to a spatial mode or a frequency mode, and
wherein decoding the first portion and the second portion comprises:
decoding the compressed bitstream in accordance with the spatial mode when the signal indicates the compressed bitstream is organized according to the spatial mode, and
decoding the compressed bitstream in accordance with the frequency mode when the signal indicates the compressed bitstream is organized according to the frequency mode.

13. The method of claim 7, wherein reconstructing the first tile includes utilizing transform coefficients associated with two or more adjacent tiles.

14. A method for reconstructing an image from a compressed bitstream, the method comprising:
accessing a compressed bitstream including encoded image data,
wherein the compressed bitstream includes a first packet comprising a first portion of the encoded image data associated with a first tile of the image and a second packet comprising a second portion of the encoded image data associated with a second tile of the image, and
wherein the compressed bitstream comprises a header having a signal indicating whether the compressed bitstream is organized according to a spatial mode or a frequency mode;
decoding the first portion of the encoded image data organized in the first packet to generate a first series of transform coefficients associated with the first tile;
decoding the second portion of the encoded image data organized in the second packet to generate a second series of transform coefficients associated with the second tile, wherein decoding the first portion and the second portion comprises decoding the compressed bitstream in accordance with the spatial mode when the signal indicates the compressed bitstream is organized according to the spatial mode, and decoding the compressed bitstream in accordance with the frequency mode when the signal indicates the compressed bitstream is organized according to the frequency mode;
reconstructing the first tile based on the first series of transform coefficients and at least a portion of the second series of transform coefficients; and
reconstructing the second tile based on the second series of transform coefficients and at least a portion of the first series of transform coefficients.

15. The method of claim 14, wherein the first tile is partitioned into a plurality of macroblocks.

16. The method of claim 15, wherein the first packet is organized into a hierarchy of bands, such that a band of the hierarchy includes a specified frequency coefficient of the plurality of macroblocks.

17. The method of claim 16, wherein the hierarchy of bands includes:
a first band carrying a DC value of all macroblocks of the plurality,
a second band carrying lowpass coefficients of all macroblocks,
a third band carrying highpass coefficients of all macroblocks, and a fourth band carrying instructions related to low-order bits of the highpass coefficients.

18. The method of claim 15, wherein the first packet is organized into a plurality of segments, and wherein each segment is associated with a single respective macroblock included among the plurality of macroblocks.

19. The method of claim 15, wherein macroblock data is organized in raster scan order.

20. The method of claim 14, wherein reconstructing the first tile includes utilizing transform coefficients associated with two or more adjacent tiles.

* * * * *